March 20, 1934.  W. WILSON  1,951,461
APPARATUS FOR MEASURING ELECTRICAL QUANTITIES
Filed Dec. 5, 1931
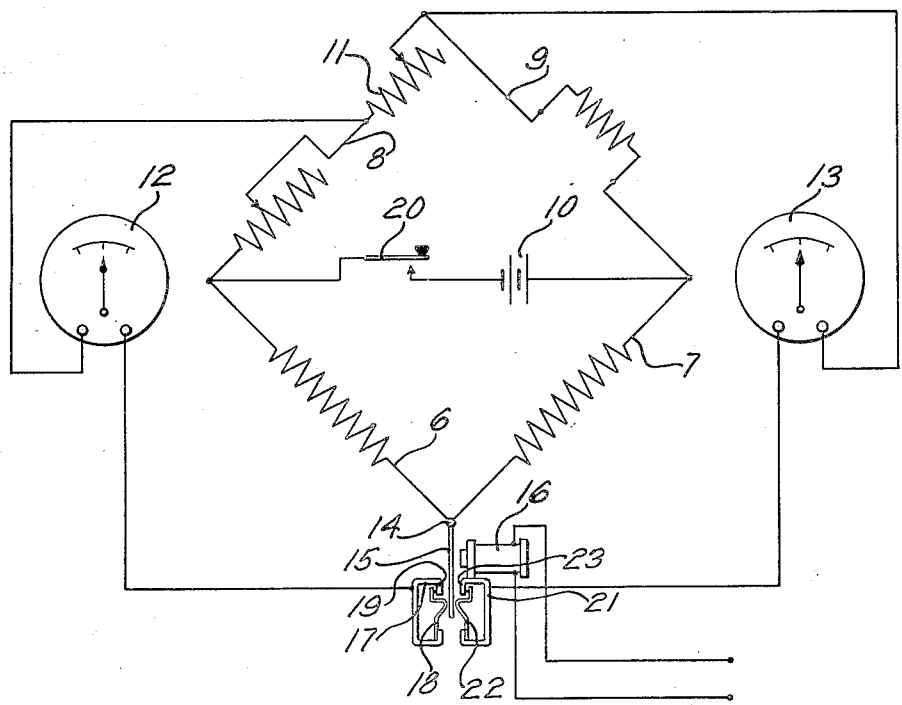
Inventor
W. Wilson
By H.A. Whitehorn Att'y.

Patented Mar. 20, 1934

1,951,461

UNITED STATES PATENT OFFICE 1,951,461

APPARATUS FOR MEASURING ELECTRICAL QUANTITIES

Wesley Wilson, Chicago, Ill., assignor to Western Electric Company, Incorporated, New York, N. Y., a corporation of New York Application December 5, 1931, Serial No. 579,223

10 Claims. (Cl. 175—183)

This invention relates to an apparatus for measuring electrical quantities and more particularly to a method of and apparatus for indicating whether the value of an electrical quantity is within a given range.

An object of the invention is to provide an efficient and effective apparatus for measuring electrical values.

In many instances, electrical units, such as resistances, condensers, and the like, are acceptable and satisfactory if the value of resistance, capacity, or other quantity is within certain limits.

In accordance with one embodiment of the invention illustrating the apparatus, a Wheatstone bridge is provided having two meters indicating simultaneously, and collectively showing whether the value of an electrical quantity falls within a given range.

A complete understanding of the invention may be had by reference to the following description taken in conjunction with the accompanying drawing, in which the single figure is a diagrammatic illustration of an apparatus embodying the invention and by means of which the invention may be practiced.

The apparatus comprises a Wheatstone bridge having equal resistances in arms 6 and 7. A standard resistance of known value is located in arm 8 and the arm 9 is adapted to receive the unknown resistance to be measured and is provided with means for readily permitting the resistance to be measured being connected into the circuit. A resistance 11, which represents the tolerance or amount that the resistance to be measured may vary above or below the standard resistance, is located in the bridge so that with respect to a galvanometer 12 it is located in arm 9 of the bridge circuit, and with respect to a galvanometer 13 it is located in the arm 8 of the bridge circuit. The bridge is energized by a source of current 10 connectible across the bridge by depressing a key 20. The point 14 of the bridge has a polarized arm 15 connected thereto which is oscillated by an electromagnet 16 energized from any suitable source of alternating current (not shown). The meter 12 is connected to a terminal member 17 having a contact spring 18, the movement of which toward the armature is limited by a downward projection 19, and the galvanometer 13 is similarly connected to a terminal member 21, having a contact spring 22, the movement of which toward the armature is limited by a downward projection 23. The contact springs 18 and 22 are in such proximity to the armature 15 that the contact between the armature and one of the contact springs is broken only a moment before contact is made with the other contact spring. Thus each meter will have a current flowing therethrough substantially one-half of the time in intervals determined by the frequency of current applied to electromagnet 16. The inertia of the armatures of galvanometers 12 and 13 is such that the galvanometers will give a constant reading.

The operation of the apparatus is as follows:

Let it be assumed that the value of the standard resistance in arm 8 of the bridge is 10,000 ohms and that the resistance to be measured may vary 5% from this value to be acceptable. The value of resistance 11 will then be chosen as 500 ohms, which is the value of the tolerance expressed in ohms instead of percentages. If now the value of the resistance being measured is less than 9,500, the deflection of the pointers of both meters will be to the left of the zero point, indicating that the value of the resistance is too low to be acceptable. If the value of the resistance being measured is over 10,500, the pointers of both meters will be deflected to the right, indicating that the value of the resistance being measured is too high to be acceptable. Any other indications of the meters will indicate that the resistance value of the resistance being measured is satisfactory. There are three possible indications which indicate a satisfactory resistance value of the resistance being measured, which are: when the pointer of galvanometer 12 is deflected to the right and the pointer of galvanometer 13 is deflected to the left; when the pointer of galvanometer 12 is not deflected and the pointer of galvanometer 13 is deflected to the left; and when the pointer of galvanometer 12 is deflected to the right and the pointer of galvanometer 13 is not deflected. While it will be noted that there are five different combinations in all, it is relatively easy to note at a glance whether the resistance is acceptable or not because it is necessary to remember only that the resistance being measured is not acceptable only when the pointers of both galvanometers are deflected to the left or when both are deflected to the right.

The invention has been described in connection with a device for measuring resistance. However, it will be apparent that other electrical quantities may be measured in the same way. For instance, if it were desired to measure the capacity of a condenser, the bridge would be energized by alternating current and a standard condenser substituted for the standard resistance, while the resistance 11 representing the tolerance limits of resistance would be replaced by a condenser representing the tolerance limits of capacity.

The nature and embodiment of the invention herein described and illustrated is merely a convenient and useful form of the invention and many changes and modifications may be made therein without departing from the scope and spirit of the invention.

What is claimed is:

1. An electrical measuring apparatus comprising a single bridge circuit having a plurality of known resistances and means for simultaneously indicating the relationship of the resistance to be measured to each of the known resistances.

2. An electrical measuring apparatus comprising a single bridge circuit including means for simultaneously determining whether an electrical quantity falls within predetermined limits, and a pair of indicating devices, one for indicating the relationship of the quantity being measured for each limit.

3. An electrical measuring apparatus comprising means for determining whether an electrical quantity falls within predetermined limits, a pair of indicating devices, one for indicating the relationship of the quantity being measured for each limit, and means intermittently connectible to a common point for causing said indicating devices to act simultaneously.

4. An electrical measuring apparatus comprising a bridge having a resistance representing the lower limit of a resistance to be measured, a second resistance representing together with the first resistance the upper limit of the resistance to be measured, an indicating device connected at one side between said resistances, and a second indicating device connected at one side at the end of said resistances, means for alternately connecting the opposite sides of said indicating devices to a point in the bridge to simultaneously indicate the relationship of the resistance to be measured to said limits.

5. An electrical measuring apparatus comprising a bridge having a resistance representing the lower limit of a resistance to be measured, a second resistance representing together with the first resistance the upper limit of the resistance to be measured, an indicating device connected at one side between said resistances, a second indicating device connected at one side at the end of said resistances, the opposite sides of said indicating devices being connectible to a point in the bridge to indicate the relationship of the resistance to be measured to said limits, and means for causing said indicators to indicate simultaneously.

6. An electrical measuring apparatus comprising a bridge including a resistance to be measured and a pair of resistances one of which is equal to the lower tolerance limit of the resistance to be measured and the other of which plus the first resistance is equal to the upper tolerance limit, a pair of indicating devices each of which is adapted to indicate whether the resistance to be measured is above or below one of the tolerance limits and means for alternately connecting said indicating devices in the circuit to operate them simultaneously.

7. An electrical measuring apparatus comprising a bridge including a resistance to be measured and a pair of resistances one of which is equal to the lower tolerance limit of the resistance to be measured and the other of which plus the first resistance is equal to the upper tolerance limit, a pair of indicating devices each of which is adapted to indicate whether the resistance to be measured is above or below one of the tolerance limits, and means for causing said indicating devices to indicate simultaneously.

8. An electrical measuring apparatus comprising a bridge circuit including means for comparing an electrical resistance with two electrical resistances in said bridge circuit, a pair of indicating devices for indicating the relationship of each, and means for automatically directing each comparison to its respective indicating device.

9. An electrical measuring apparatus comprising means for comparing an electrical resistance with two electrical resistances, a pair of indicating devices for indicating the relationship of each, and a polarized relay for directing each comparison to its respective indicating device.

10. An electrical measuring apparatus comprising a bridge circuit having a source of electrical energy connected across two vertices thereof, a pair of indicating devices, means for alternately connecting said indicating devices to a third vertex, the opposite sides of said indicating devices being connected to different vertex points whereby the resistance of an element in the bridge circuit may be determined within predetermined limits.

WESLEY WILSON.